US011565787B1

(12) United States Patent
Neely et al.

(10) Patent No.: US 11,565,787 B1
(45) Date of Patent: Jan. 31, 2023

(54) MORPHING AIRFOIL

(71) Applicant: Government of the United States, as represented by the Secretary of the Air Force, Wright-Patterson AFB, OH (US)

(72) Inventors: Jared Neely, Troy, OH (US); James Joo, Centerville, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 142 days.

(21) Appl. No.: 17/130,560

(22) Filed: Dec. 22, 2020

Related U.S. Application Data

(60) Provisional application No. 62/957,499, filed on Jan. 6, 2020.

(51) Int. Cl.
*B64C 3/48* (2006.01)
*B64C 3/26* (2006.01)
*B64C 3/44* (2006.01)

(52) U.S. Cl.
CPC .................. *B64C 3/48* (2013.01); *B64C 3/26* (2013.01); *B64C 2003/445* (2013.01)

(58) Field of Classification Search
CPC ........... B64C 3/48; B64C 3/182; B64C 3/187; B64C 3/26; B64C 2003/445
See application file for complete search history.

(56) References Cited

U.S. PATENT DOCUMENTS

| | | | |
|---|---|---|---|
| 7,798,443 B2 | 9/2010 | Hamilton | |
| 7,909,292 B2 | 3/2011 | Law | |
| 9,033,283 B1 | 5/2015 | Hemmelgarn | |
| 9,145,198 B1 | 9/2015 | Shome | |
| 9,233,749 B1* | 1/2016 | Joo | B64C 3/48 |
| 9,598,167 B2 | 3/2017 | Grip | |
| 9,745,048 B2 | 8/2017 | Wood | |
| 9,896,188 B1 | 2/2018 | Joo | |
| 2006/0145029 A1 | 7/2006 | Lonsinger | |
| 2006/0157623 A1 | 7/2006 | Voglsinger | |
| 2006/0186269 A1* | 8/2006 | Kota | B63B 1/32 244/123.1 |
| 2012/0104181 A1 | 5/2012 | Rix | |
| 2019/0127043 A1* | 5/2019 | Krog | B64C 23/005 |
| 2019/0256189 A1* | 8/2019 | Fenske | B64C 3/44 |
| 2022/0126979 A1* | 4/2022 | Colombiès | B64C 3/30 |

* cited by examiner

*Primary Examiner* — Rodney A Bonnette
(74) *Attorney, Agent, or Firm* — AFMCLO/JAZ; Matthew D. Fair

(57) ABSTRACT

The present disclosure defines a morphing airfoil having a dynamic flexible anisotropic skin system that is capable of carrying high level aerodynamic (or fluid) pressure loads over a structural surface. The structural surface can morph and bend in response to control inputs to change a lift force without separate movable control surfaces. The anisotropic skin is attached to underlying active and compliant structures. A control system causes the underlying support structure to move to a desired location which in turn causes the skin to bend and/or flex without exceeding a stress threshold and thus vary the lift profile along a span of the airfoil.

23 Claims, 17 Drawing Sheets

US 11,565,787 B1

MORPHING AIRFOIL

RIGHTS OF THE GOVERNMENT

The invention described herein may be manufactured and used by or for the Government of the United States for all governmental purposes without the payment of any royalty.

TECHNICAL FIELD

The present disclosure generally relates to a morphing airfoil (or hydrofoil) having a flexible anisotropic load carrying skin, a compliant rib structure and a control system to cause the airfoil to morph and change a lift profile.

BACKGROUND

Airfoils provide aerodynamic or hydrodynamic lift and control for vehicles such as aircraft, watercraft, automobiles or other apparatus that move through a fluid. Airfoils typically include a movable portion operably connected to a fixed portion to change the variable lift forces across a span thereof. As an example, aircraft wings and tails include fixed or static structure with connected movable portions such as ailerons, flaps, slats, rudders, elevators, etc. The movable portion of the airfoils are used to vary the lift of the airfoil and therefore permit maneuverability of the vehicle within an ambient fluid. By using only a portion of an airfoil to vary the lift, inefficiencies in the form of pressure (drag) losses are generated.

When industry and academia have looked at morphing aircraft wings in the past, they have focused primarily on the structure that creates the shape change under the skin of the wing. The problem is that to achieve the complex surface geometry the skin needs to able to bend and flex across the entire wing in addition to carrying aerodynamic pressure loads. Elastomers are a common material used in morphing skin concepts, however they tend to be heavy and susceptible to UV decay. To withstand the aerodynamic pressure loads, the elastomer must be pre-tensioned to be effective. The use of elastomers can lead to skin drooping or ballooning under high pressure loads, and the high strains associated with deforming a pre-strained skin can lead to high actuation loads and undesirable energy storage in the elastomeric skin. As these and other existing systems have various shortcomings, drawbacks, and disadvantages relative to certain applications, there remains a need for further contributions in this area of technology.

SUMMARY

One embodiment of the present disclosure includes a unique morphing airfoil for use on vehicles that move through a fluid. Other embodiments include apparatuses, systems, devices, hardware, methods, and combinations wherein the morphing airfoil includes a substantially continuous skin that is flexibly connected to compliant structural support ribs that are controlled to a desired shape to provide for aerodynamically efficient lift and control of the vehicle. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
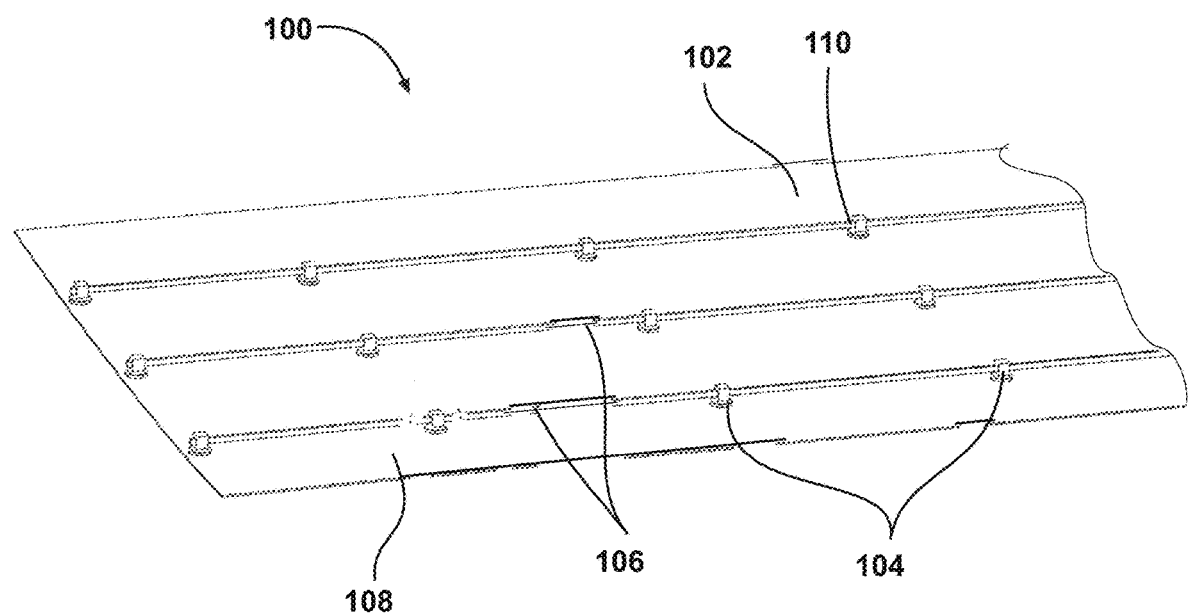
FIG. 1 shows a section of compliant skin material with a number of standoff mounts attached thereto and with stringers extending through the mounts.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure is directed to an airfoil having flexible/compliant skin that has anisotropic mechanical properties that are necessary to maintain a surface shape thereof. The skin carries the fluid dynamic pressure loads across a morphing/deforming control surface and distributes the net pressure loads to the underlying structure. It should be noted that while the disclosed embodiment is directed to an aircraft wing that "morphs" into different shapes to change lift and drag characteristics thereof, the present invention is not limited as such. For example the morphing airfoil may be used in other applications such as automotive or watercraft operations. Terms describing the morphing airfoil or portions thereof can include control surfaces, wings, tails, airfoils, hydrofoils, waterfoils and as such may be used interchangeably throughout the specification. Regardless of which terms are used herein, each denote fluid dynamic structures that generate lift forces and variation in lift forces as a vehicle moves through a fluid or in stationary structures such as windmills.

The flexible/compliant skin design for camber morphing control surfaces addresses the need for a load carrying skin that can be used to create a smooth and continuous control surface profile, which can used to span large distances between the control points (actuator ribs) that drive surface deformation. The representative embodiment described herein allows the underlying surface control structure to interface with the skin in a manner that transfers loads without using traditional fastening and bonding techniques. Prior techniques that bonded the skin to the structure are more highly constrained in degrees-of-freedom of the skin-to-structure interface. Structure-bonded skin also result in high actuation forces and undesirable interactions between internal control actuators. This occurs when actuated control points are independently controlled and differ in deflection angle because the distance between the deflected control points, having differing deflections, will always be larger than the distance between deflected control points which deflect in unison (if no skin is bonded). However, if a non-elastic material is bonded across the control surface, the distance between the control points is fixed, and the control points are forced to move/bend inward towards each other to maintain the same fixed distance between control endpoints, while in the presence of differing deflections. The adaptive conformal skin system eliminates the aforementioned cause of actuator interaction by allowing the actuated control points (actuated ribs) to slide relative to the underside of the fixed length (non-elastic) skin surface spanning across the structure.

The flexible/compliant skin design can be implemented into any application where a morphing/deforming control surface in a fluid flow is desired to improve control performance and reduce drag. One such application is in the aerospace industry, where aircraft wings, elevators, rudders, empennage structure, shape changing air intakes, propeller blades, or other lift surfaces/devices are used. Another application is in the automotive industry where shape changing spoilers or exterior flow control can improve performance. Yet another application is the marine industry where a smooth surface camber changing rudder or other control surface can improve operating performance.

The present invention addresses the need for a morphing control surface skin that secures to (and conforms to) a surface shape defined by multiple internal actuated structural members, without adding unnecessary actuation forces to the overall morphing control surface system. This arrangement is permissive of pivoting and translation relative to the underlying dynamic structure by allowing degrees of freedom which would otherwise contribute to an undesirable in-plane shear stress within the deforming skin.

The flexible composite laminate skin is the component that comes into direct contact with the fluid flow on the airfoil surface and creates a smooth lifting control surface. In one embodiment, a layup of composite fiber/fabric plys can be used with unidirectional fiber/fabric running in the spanwise direction, in order to provide additional stiffness for carrying skin pressure loads across unsupported spans between surface deformation control ribs or similar control mechanisms. Additional layers of fabric can be placed in areas where additional stiffness is desired, such as along the trailing edges of the skin.

Flexible stringers can be formed from unidirectional carbon fiber extruded rods or tubes. In one embodiment, the flexible stringer have a square cross-section, but other cross sectional configurations are contemplated herein. The stringers can be positioned parallel to the spanwise direction of the airfoil or wing. The stringers carry the aerodynamic loads from the skin, transferred through stringer standoff mounts, and distribute the forces across the static and dynamic internal structural components of the airfoil.

Stringer standoff mounts are bonded or fastened to the inner surface of the skin. The standoff mounts provide an elevated connection between the flexible stringers to the skin. Spacing the stringers away from the inner surface of the skin increases the out-of-plane moment of inertia, which serves to further increase out-of-plane and spanwise bending stiffness of the airfoil. The standoff mount configuration also provides space between the inner skin surface and the stringers, which is used to interface the stringers with the internal structure and actuated shape control devices. Standoff mounts are positioned to the internal side of internal structural components, for attaching and constraining motion. The standoff mounts can be spaced so that the distance between the underlying structure and/or standoff mounts is generally consistent across all the structure. In other forms the mounts are positioned at variable distances from one another along a length of the airfoil. The mounts are also placed close enough together to sufficiently distribute the pressure loads to the stringers.

The stringer standoff mounts have a unique pass through opening that allows the flexible stringers to pivot inside the standoff mounts. The pass-through opening has an hourglass shape in some embodiments. This hourglass shape reduces stress concentrations on the stringers at the edge of the standoff mounts, particularity when the skin is simultaneously bending and twisting. This allows the stringers to bend and twist with the flexible composite skin. To further increase the flexibility of the stringer reinforced skin, the stringers are not constrained in a longitudinal direction such that sliding can occur relative to the pass-through of the standoff mounts when the airfoil morphs into different shapes. This is achieved by fixing all degrees-of-freedom of the standoff mount-stringer interface at a single location for any given stringer. Redundant fastening mechanisms are installed to prevent stringer slide-out, should the single fixed location fail during operation.

A dynamic conformal skin system provides for camber morphing control surfaces that are smooth and continuous (e.g. without flow interruption features such as hinges, slots and the like). The control surface profile can span large distances between the control points that drive surface deformation. The representative design configuration allows the underlying surface control structure to interface with the skin in a manner that transfers loads without using traditional fastening and bonding techniques. Such prior fastening or bonding techniques have been shown to constrain the degrees-of-freedom of the skin-to-structure interface and can result in high actuation forces and undesirable interaction between internal control actuators.

The dynamic conformal skin system has the potential to be implemented into any field-of-use where a camber morphing/deforming control surface in a fluid flow is desired. The deformable surface can serve to improve overall control performance and reduce drag in the implemented device. One application is in the aerospace industry, for use on parts/surfaces such as aircraft wings, elevators, rudders, empennages, shape changing air intakes, propeller blades, other lift surfaces/devices, and so forth. The dynamic conformal skin system can also be used in the automotive industry for shape changing spoilers or exterior flow controlling surface panels. The dynamic conformal skin system can also be used in the marine industry, for instance as a smooth surface camber changing rudder or other type control surface that would benefit from a smooth surface.

The dynamic conformal skin system is a novel approach to creating a camber morphing control surface, which is accomplished by combining a flexible dynamic outer skin that translates and conforms to an underlying shape controlling structure. The underlying structure is comprised of multiple active and passive shape control components to achieve a smooth and continuous control surface.

The flexible anisotropic load carrying skin for camber morphing control surfaces, which is used in this camber morphing control system is a part of the overall system. The flexible anisotropic load carrying skin is composed of a flexible composite skin, flexible stringers and stringer standoff mounts. The compliant structural support ribs for camber morphing control surfaces, which a part used in this camber morphing control system is described in more detail above.

The dynamic skin system is capable of carrying design limit level aerodynamic pressure loads in a manner wherein the flexible stringers interface with the actuated position control ribs, the passive compliant support ribs, and the flexible composite skin system. The implemented system is equipped with a number of strategically positioned stringer standoff mounts which receive the flexible stringers and help to control the bending of the skin and structural surface.

Referring now to FIG. 1, a portion of an airfoil 100 having a section of flexible compliant skin 102 with standoff mounts 104 attached thereto is depicted. The skin 102 can generally be any shape or configuration depending upon the application for the airfoil 100. The standoff mounts 104 are attached via mechanical means including a glue or an epoxy to an inner surface 108 of the skin 102 in a plurality of locations. A plurality of stringers 106 are inserted through openings 110 in the standoff mounts 104 lengthwise or longitudinally along the surface 108 of the skin 102. The stringers 106 transmit an actuation force to the skin 102 such that the skin 102 morphs into a different shape to change the lift profile of the airfoil without a separate hinged control surface as is traditional.

Figure 2:
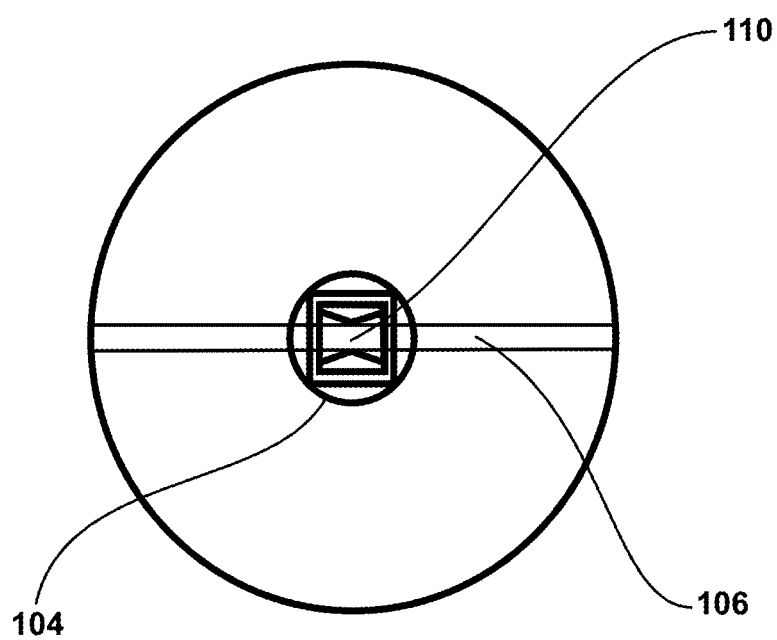
FIG. 2 is an enlarged view of a mount and stringer from FIG. 1.

Referring now to FIG. 2, an enlarged view of a standoff mount 104 is illustrated. The mount 104 includes an opening 110 extending therethrough that has an hourglass shape e.g. inwardly tapered wall extending from either end thereof. This allows the stringer 106 to slide through the opening, but also allows the mount to twist slightly without bending the stringer, wherein such bending might cause problematic stresses on the skin 102, the mount 104, and the stringer 106.

Referring now to FIGS. 3A through 3D, several views of representative standoff mounts 104 are shown. The standoff mounts are designed to be attached (glued or otherwise mechanically affixed) to the inner surface of the flexible skin 102. The stringers 106 extend through the openings 110 in the mounts 104 at a defined distance from the skin surface. The standoff distance can vary from a relatively small distance to a relatively large distance, depending upon the system application.

Figure 3A:
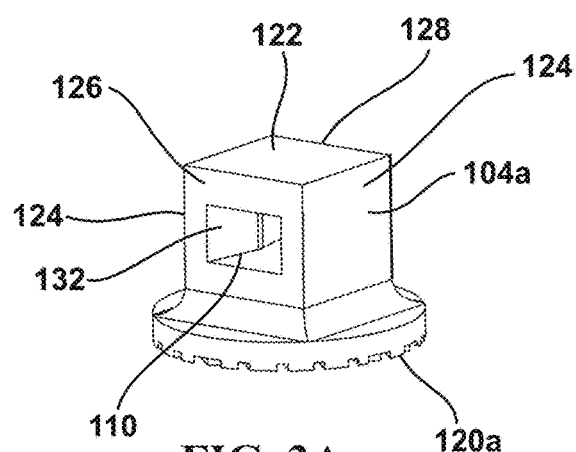
FIGS. 3A-3D are perspective views of exemplary standoff mounts according to some embodiments of the present disclosure.
Figure 3B:
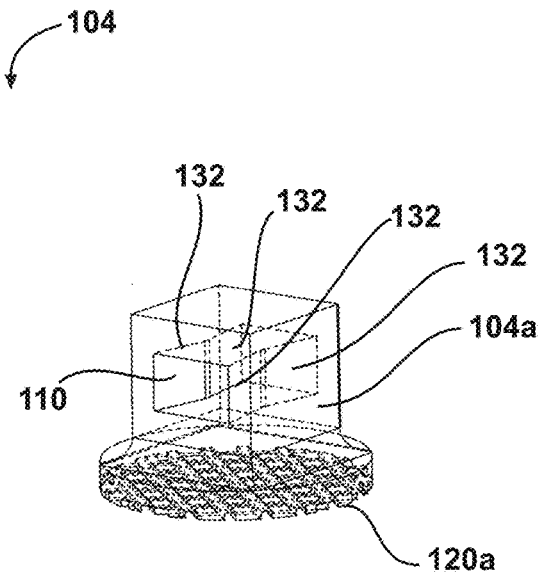

Referring more particularly to FIGS. 3A and 3B, perspective views showing one embodiment of a standoff 104a with solid and hidden lines, respectively. The standoff 104a generally includes bottom mounting surface 120a that is configured to be uneven (for instance, rough, waffled, scored, or castellated). This uneven bottom surface 120a can assist in attaching the standoff mount 104a to the surface of the compliant skin 102. The mount 104a includes opposing sidewalls 124 with front and back walls 126, 128. An opening 110 is formed through the front wall 126 and extends through the back wall 128 and is configured to receive a stringer 106 therethrough. It should be noted that the mounts 104 may have shapes other than that shown in the disclosed embodiments. For example, the mounts 104 may be round or may include more than four distinct outer walls. In the disclosed embodiment, the opening 110 is shown to be square and has tapered inner sides 132, which form an hourglass shape when viewed from above in a cross-sectional view. The hourglass opening 110 includes tapered or angled sidewalls 132 extending from the front and back walls 126, 128, respectively and intersect at an intermediate position internal to the mount 104. These tapered walls 132 allow the stringer 106 to run through the opening 110 without undue stresses being exerted upon the stringer 106 and the mount 104 and the various parts move to effectuate bending of the associated underlying structure. It should be noted that other configurations of openings (e.g. other than hourglass) 110 may be used without departing from the teachings of this disclosure.

Figure 3C:
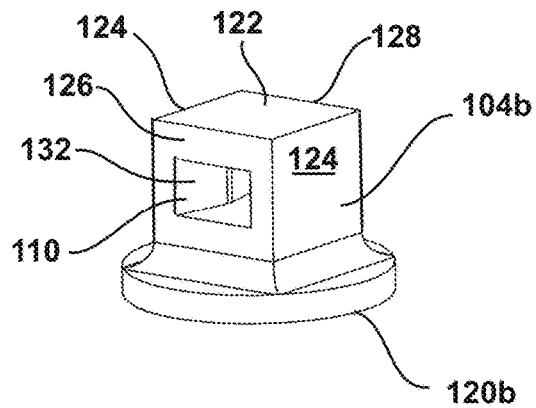
Figure 3D:
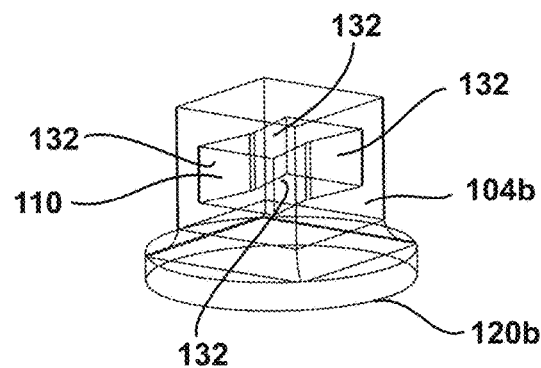

FIGS. 3C and 3D depict an alternate embodiment of a mount 104b with a solid perspective view and a hidden line perspective view, respectively. The mount 104b is similar to mount 104a with the exception that it has a substantially flat bottom 120b.

Figure 4:
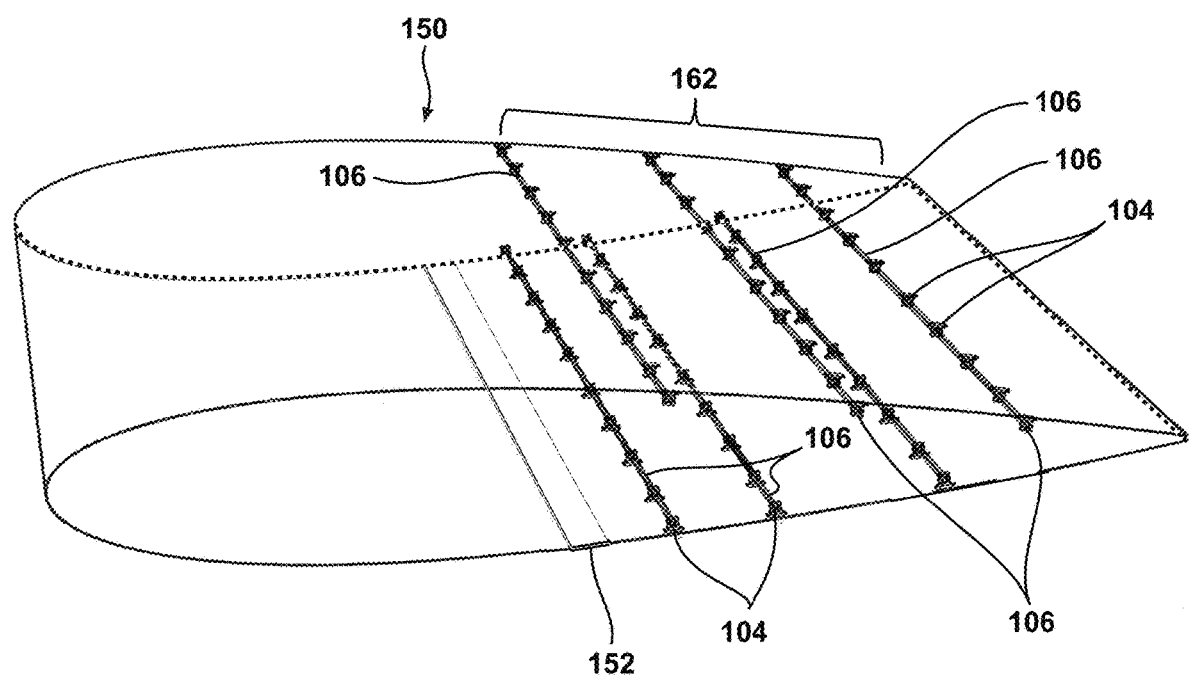
FIG. 4 is a cross-sectional partially transparent view of a cambered wing having standoff mounts attached to the compliant skin and flexible stringers placed through the mounts.

FIG. 4 is a perspective side view of an exemplary cambered wing section 150 with the skin removed to show standoff mounts 104 and stringers 106 along a trailing edge portion 162. The bottom surface and the top surface of the flexible conforming skin (removed for clarity) of the trailing edge portion 162 includes a series of standoff mounts 104 attached thereto. The upper and lower standoff mounts 104 have stringers 106 that are positioned though the series of openings created by the (generally) aligned mounts 104. A translational lap joint 152 is located on the lower skin surface that includes overlapping skin that permits translation and pivoting motion when the wing is deformed or morphed.

Figure 5A:
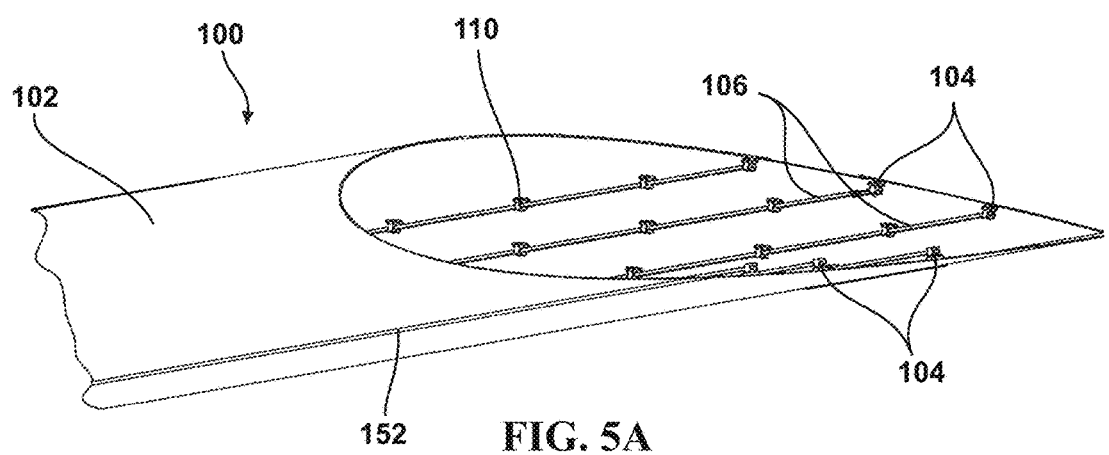
FIG. 5A is another cross-sectional view of a cambered wing section having standoff mounts attached to the compliant skin and stringers placed through the mounts.
Figure 5B:
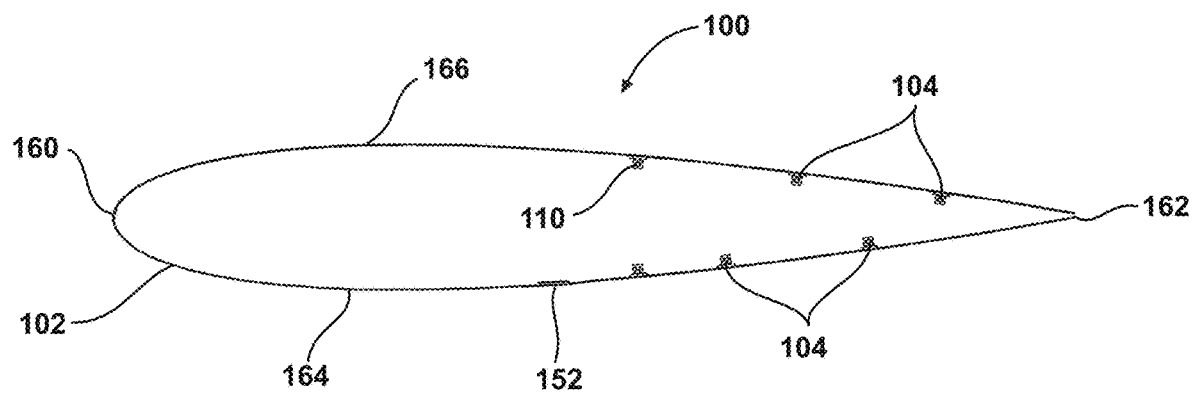
FIG. 5B is a side-view of a cambered wing section having standoff mounts attached to the compliant skin and stringers placed through the mounts.

FIGS. 5A and 5B shows other views of a cambered wing structure 100 extending from a leading edge 160 to a trailing edge 162. The wing structure 100 includes a conforming flexible skin 102, standoff mounts 104, and stringers 106 placed through openings 110 in the mounts 104. A series of standoff mounts 104 are attached to the lower portion 164 of the flexible conforming skin 102. The stringers 106 are positioned through the openings 110 and held by the attached mounts 104. Similarly, a series of standoff mounts 104 are attached to the upper portion 166 of the flexible conforming skin 102 to receive stringers 106 connected therethrough along a trailing edge 162 of the wing structure 100.

Figure 6:
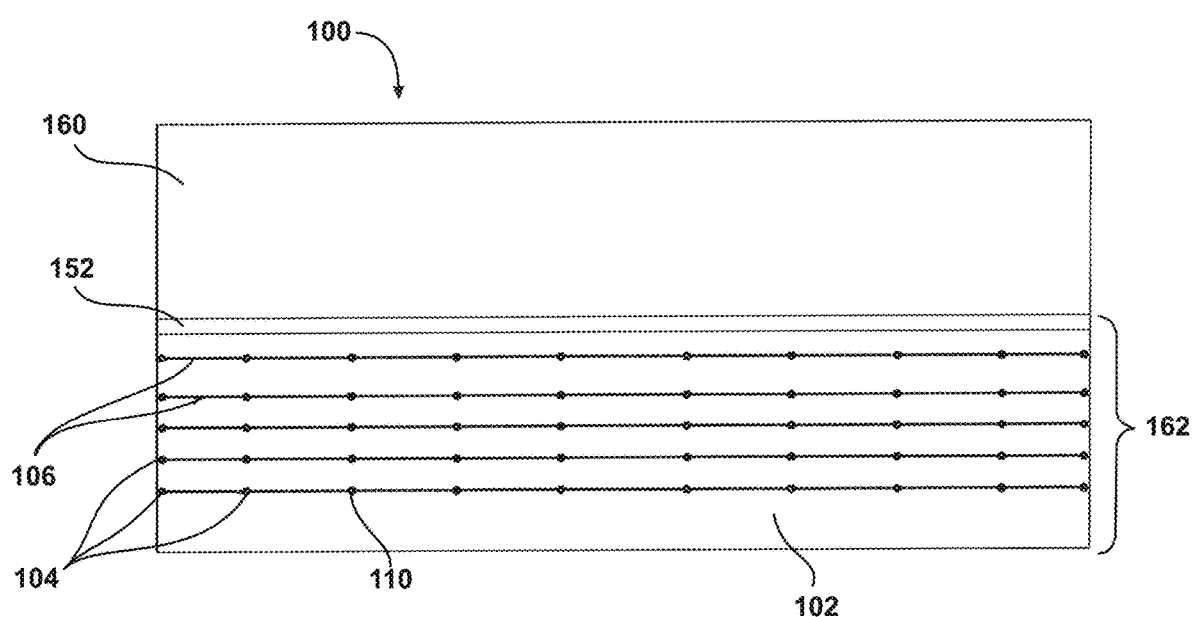
FIG. 6 is a bottom plan view of a cambered wing section with a portion of the skin removed to show standoff mounts and stringers attached thereto.

FIG. 6 is a bottom plan view with the skin removed to show hidden lines of a cambered wing section 100. The trailing edge 162 of the cambered wing 100 is the portion that is configured to move or bend. Therefore, a series of standoff mounts 104 are strategically attached along the surface of the flexible conforming skin 102. A series of stringers 106 are then positioned through aligned of openings 110 of the attached standoff mounts 104. A translational lap joint 152 is located on the lower skin surface that includes overlapping skin that permits translation and pivoting motion when the wing is deformed or morphed.

Figure 7:
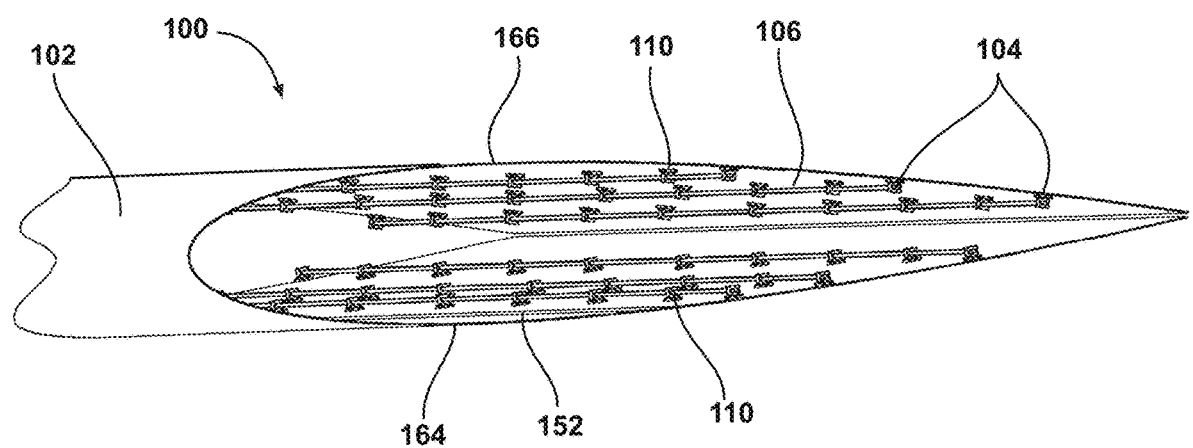
FIG. 7 is another cross-sectional view of a cambered wing section having standoff mounts attached to the compliant skin and stringers placed through the mounts.

FIG. 7 is another view of a cambered wing section 100 having a flexible conforming skin 102 with standoff mounts 104 affixed thereto and stringers 106 running through the openings 110 in the standoff mounts on the suction side 166 and the pressure side 164 of the wing 100. A translational lap joint 152 is located on the lower skin surface.

Figures 8A, 8B:
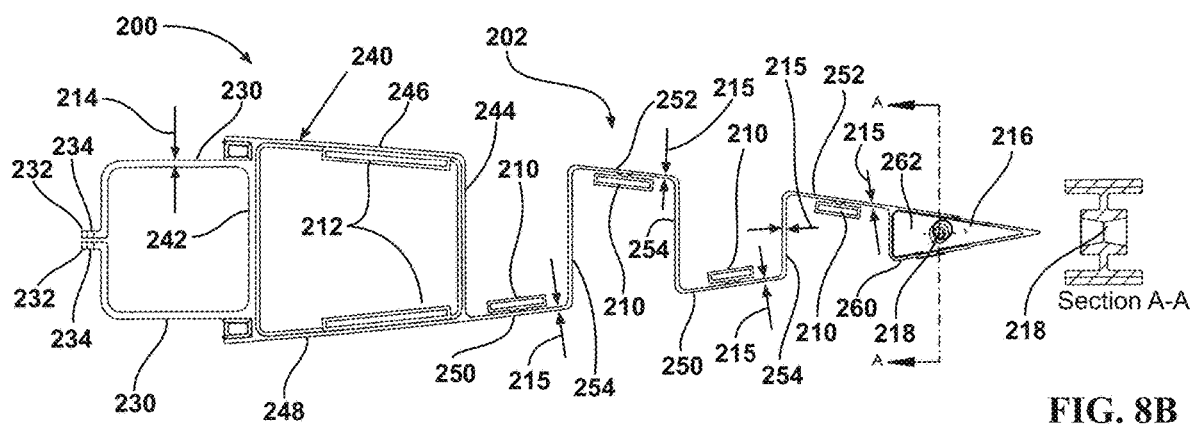
FIGS. 8A-8C are side, perspective and cross-sectional views of a compliant structural support rib.
Figure 8C:
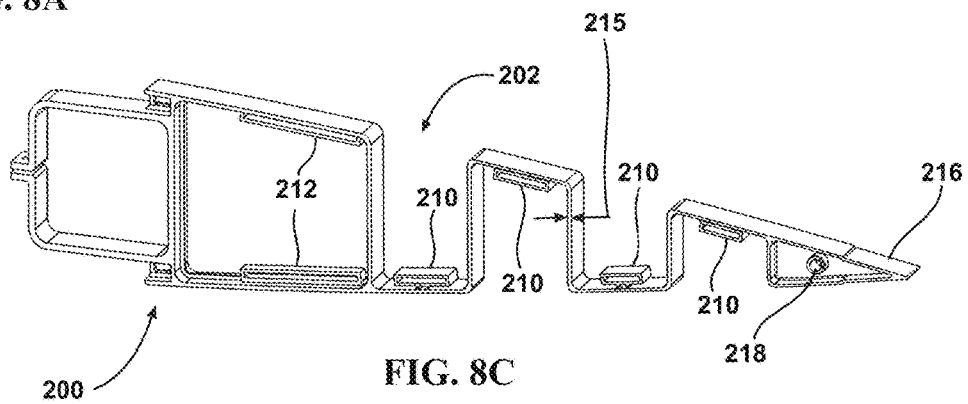

Referring to FIGS. 8A-8C, a compliant structural support rib 200 is illustrated in a side view and a perspective view, respectively. A plurality of compliant ribs 200 are assembled within the morphing airfoil to provide structural support while permitting a morphing movement of the airfoil. The compliant ribs 200 provides structural capabilities that maintain the cross-sectional airfoil profile through a wide range of control surface deflections between actuated control points.

The purpose of the compliant structural support ribs 200 is to maintain and control the airfoil profile of a morphing control surface in-between actuated (active) ribs (to be described below), where the upper and lower control surface skins would otherwise be unsupported between active ribs. The compliant support ribs 200 constrain the translational motion of the control surface skins relative to one another. The support ribs 200 enable effective and efficient transfer of pressure loads into the primary load-carrying structure through a full range of dynamic motion, while adding minimal actuation force resistance to the morphing control surface system.

In the exemplary embodiment, the compliant support ribs 200 have a unique square wave shaped structure 202 that is formed between the upper and lower control surfaces to provide support between the pressure side and suction side surfaces of the airfoil under loading and during actuated deflection (e.g. morphing). The compliant support ribs 200 have integrated stringer channels or slots 210 and 212 to constrain the motion of stringers 106 (not shown) that extend therethrough. Wall thicknesses 214 at the forward end and 215 at the aft end of the compliant support ribs 200 are optimized to bend and deflect to the target deformed airfoil profile with minimal applied force to reduce the required control surface actuation force, while providing sufficient structural support of the skin. The wall thicknesses 214 and 215 may be the same in some embodiments and different in others.

The compliant support ribs 200 are passive dynamic structural devices that are driven from the displacement of the flexible skin and flexible offset stringers. The compliant support ribs 200 maintain the airfoil cross-section between actuation ribs that are of equal deflection and transition the deflection of the airfoil cross-section when located between actuated control points of differing deflection angles. This results in a smooth and continuous transition between actuator ribs, which creates a surface that reduces flow separation at the trailing edge 216.

In one embodiment, a square, rectangular or other periodic wave shape structure 202 forms the structural shape of the rib 200. The trailing edge 216 of the support rib 200 is movable in an up and down manner to morph in response to movement of the skin when the airfoil actuators are activated as will be described in more detail below. The compliant rib 200 includes a pair of opposing arms 230 extending forward proximate a leading edge of the airfoil. Each of the opposing arms 230 project radially inward from a first portion and terminate at a forward facing lip 232. A through aperture 234 is formed through each of the lips 232 to facilitate clamping or fastening around a front or main spar (not shown). An enclosed element 240 extends aft of the opposing arms 230. The enclosed element 240 includes a forward wall 242 and an aft wall 244 with an upper wall 246 and lower wall 248 extending between the forward and aft walls 242, 244 respectively. A stringer channel 212 connected to the upper wall 246 and the lower wall 248 of the enclosed element 240. The periodic structure 202 formed in a substantially square wave pattern extends aft of the enclosed element 240. The periodic structure 202 includes intermittent bottom walls 250 connected to intermittent top walls 252 with side walls 254 extending therebetween. The top walls 252 and bottom walls 250 can be inwardly tapered toward the trailing edge 216 to provide support for skin in an airfoil shape. Each of the top walls 252 and the bottom walls 250 include a stringer slot 210 connected thereto. The periodic structure 202 is flexible, but provides sufficient strength to hold the skin in a desired shape. The trailing edge 216 is defined by a triangular structure 260 with a solid wall 262 formed therein.

Referring more particularly to FIG. 8B, a cross-sectional view of section A-A in FIG. 8A illustrates a revolving hour-glass shaped stringer pass-through aperture 218 which permits a trailing edge stringer 800 (see FIG. 13) to be connected through the trailing edge of each compliant support rib 200, as well as through each actuated control rib to be described below. The stringers 106 pass through the motion constraining slots 210 for relatively smaller displacements and through constraining slots 212 for larger displacement control depending on the orientation of support rib installation. A surface at the trailing edge 216 is attached to the inner surface 108 (not shown, see FIG. 1) of the skin 102 (not shown, see FIG. 5B) by means bonding or traditional fasteners. This helps keep the shape of trailing edge with the help of the trailing edge stringer 800 (see FIG. 13) through the hourglass cross-sectional holes 218 of compliant ribs 200 and the aperture 554 (see FIG. 13) located near the trailing of the actuated ribs 400 (see FIG. 13).

Figure 9A:
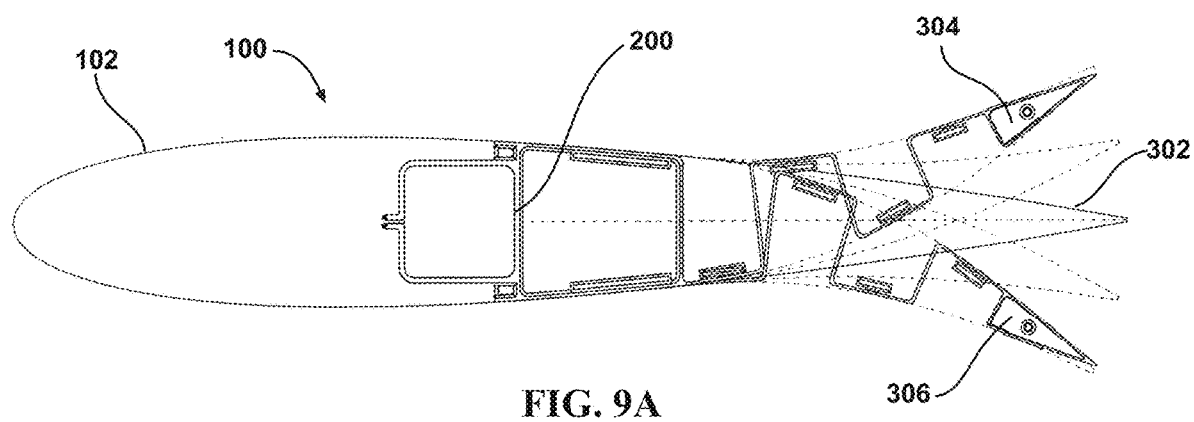
FIGS. 9A and 9B are side cross sectional views of the compliant structural support rib in multiple deflected configurations.
Figure 9B:
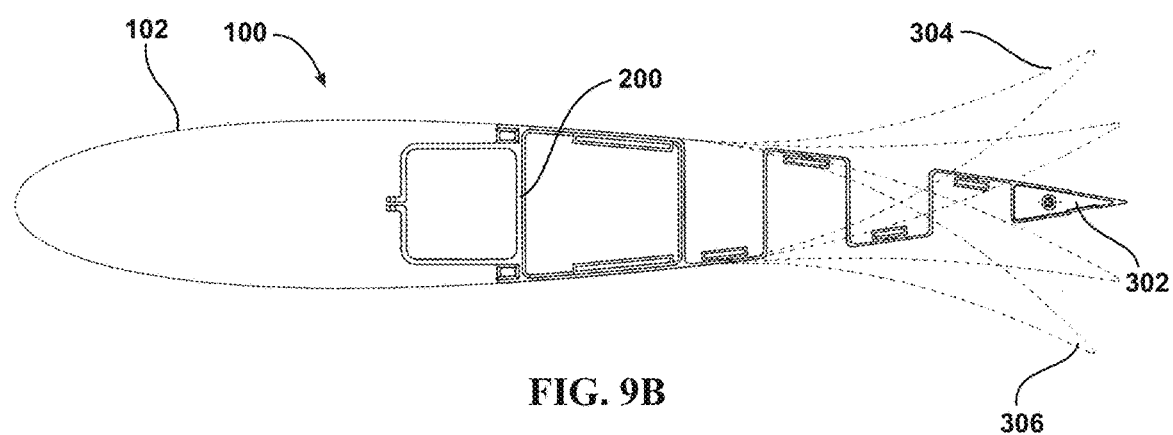

Referring now to FIGS. 9A and 9B, an exemplary airfoil 100 with a compliant support rib 200 is shown in deformed and un-deformed states. The un-deformed (neutral) state 302 of the compliant support rib 200 is shown along with maximum deflected upward position 304 and maximum downward deflected position 306. The position of the trailing edge can be moved anywhere between the maximum upward and downward positions 304, 306 respectively. The deflections cause a continuous (no discrete hinge) parabolic flap airfoil profile. The flexible composite skin 102 forms a continuous morphed surface profile around the support ribs 200. The compliant support ribs 200 are capable of achieving smooth deflections that follow the deflected conformal airfoil profiles in the upward deflected 304 and downward deflected 306 configurations.

Figure 10A:
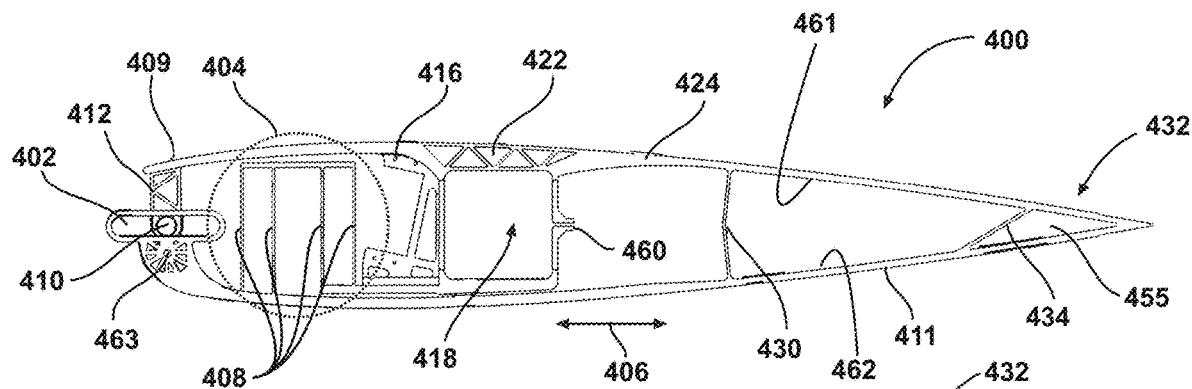
FIGS. 10A-10C are perspective views of a main actuator rib.
Figure 10B:
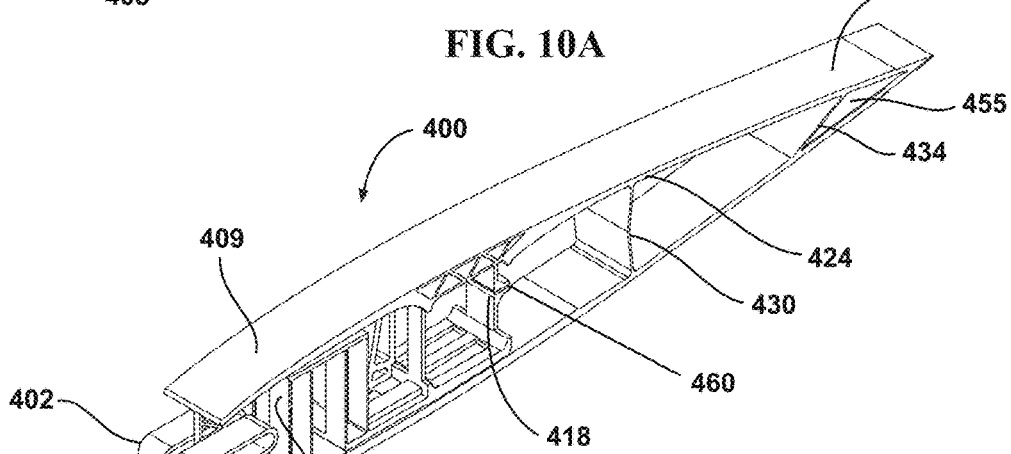
Figure 10C:
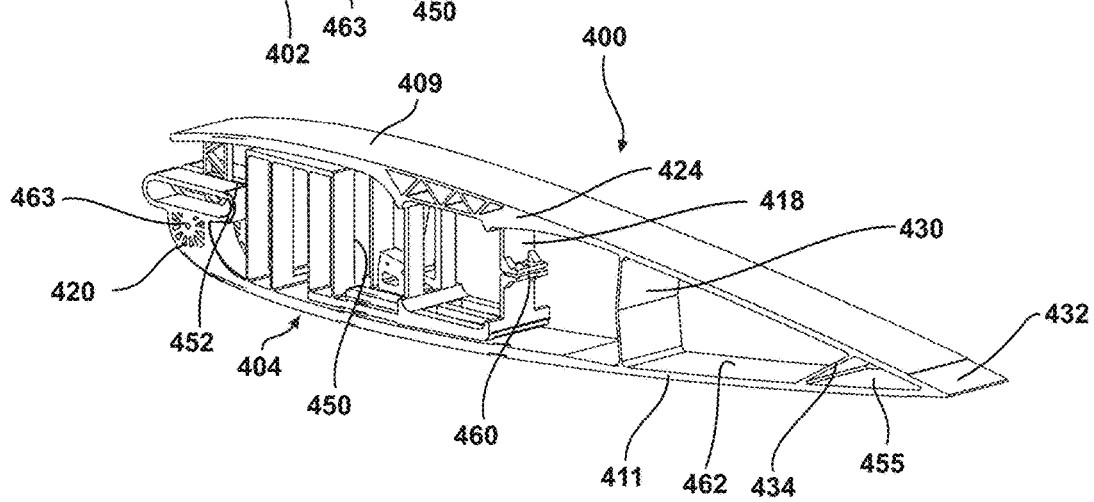

Referring now to FIGS. 10A-10C, a primary or actuator rib 400 is configured to provide dynamic control of the camber morphing of the conformal skin system. A plurality of actuator ribs 400 control the shape of the airfoil. Each actuator rib 400 includes a motion control slot 402 and a compliant mechanism 404 to permit flexible movement of the actuator rib 400 to achieve effective camber control. The compliant mechanism 404 provides smooth motion in a chordwise direction (double arrow 406) due to the vertical flexible compliant legs 408 that bend under a chordwise force. An upper portion 409 of the actuator rib 400 is fixed to a front spar (not shown) via a pass through aperture 410. The front spar (not shown) passes through the aperture 410 formed in a vertical support member 412 that is connected to the upper portion 409 of the actuator rib 400. The motion of slot 402 is operable to slide back and forth across the aperture 410 and fixed front spar. A control linkage attachment point 466 (See FIGS. 11A-11C) transmits a force from a rotary drive actuator (not shown) into the actuator rib 400 at the aperture 463 to deflect the trailing edge 432 up and down. The rotary actuator (not shown) is mounted onto the actuator rib 400 using mounting holes 416. The actuator rib 400 attaches to a main spar 500 (see FIG. 12) with a spar attachment member 418 which can be clamped together by way of a fastening flange 460. Material can be removed from the actuator rib 400 for weight reduction at locations 420 and 422. A tapered stiffness member 424 aft of the spar attachment member 418 on the upper surface 409 provides hinge point tailoring in combination with a compliant web 430. These features permit the upper surface 409 and a lower surface 411 near the actuator rib 400 to be connected together in a flexible manner.

A rigid web 434 extends between the upper and lower surfaces 409, 411 at the aft portion of the trailing edge 432. This structure causes all features aft of the rigid web 434 to translate as a displacement extension of the forward compliant features.

The compliant mechanism 404 has a split line 450 at an intermediate location that can be at the centerline in some forms. Similarly, the motion control slot 402 has a split line 452 at an intermediate position. The split lines 450, 452 allow the control linkage to be installed inside the rib 400 proximate the center plane. The triangular area 455 aft of the rigid web 434 is used to mount various inserts and connector interfaces with the trailing edge stringers (not shown), similar to the attachment feature 218 in the compliant support rib 200.

Figure 11A:
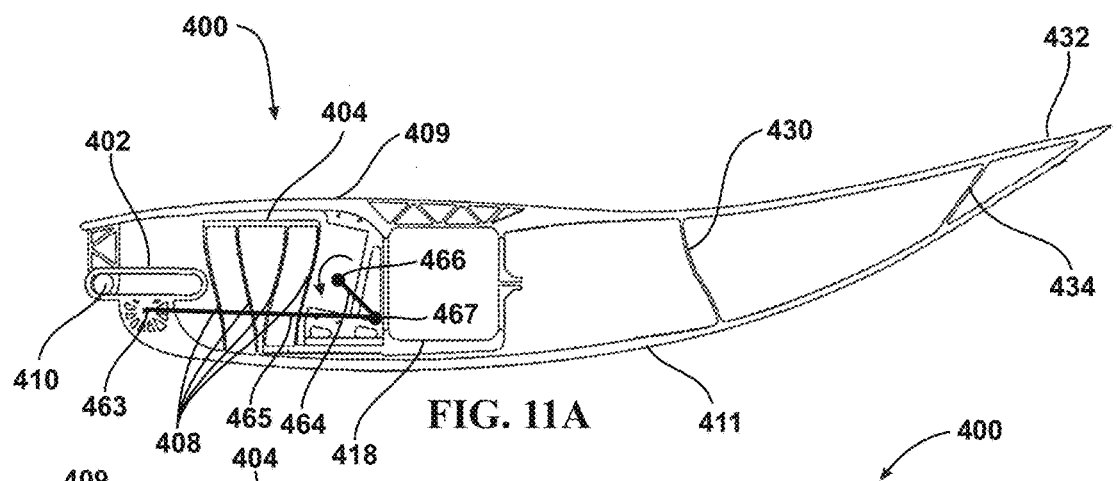
FIGS. 11A-11F are various views of the main actuator rib structure in deflected positions.
Figure 11B:
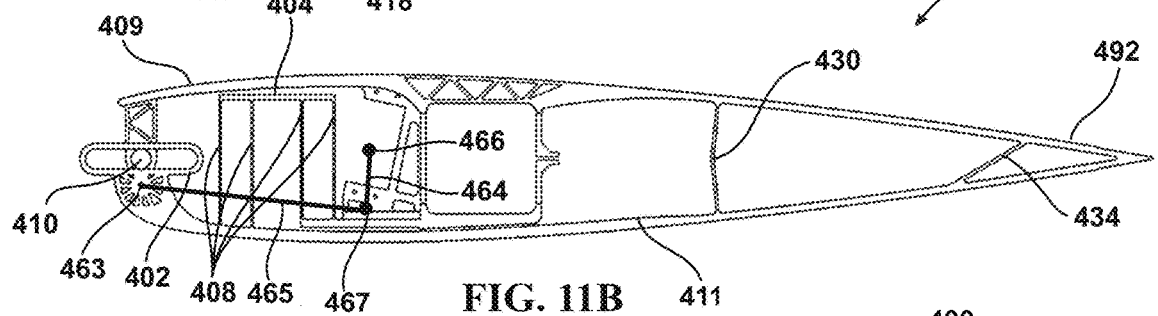
Figure 11C:
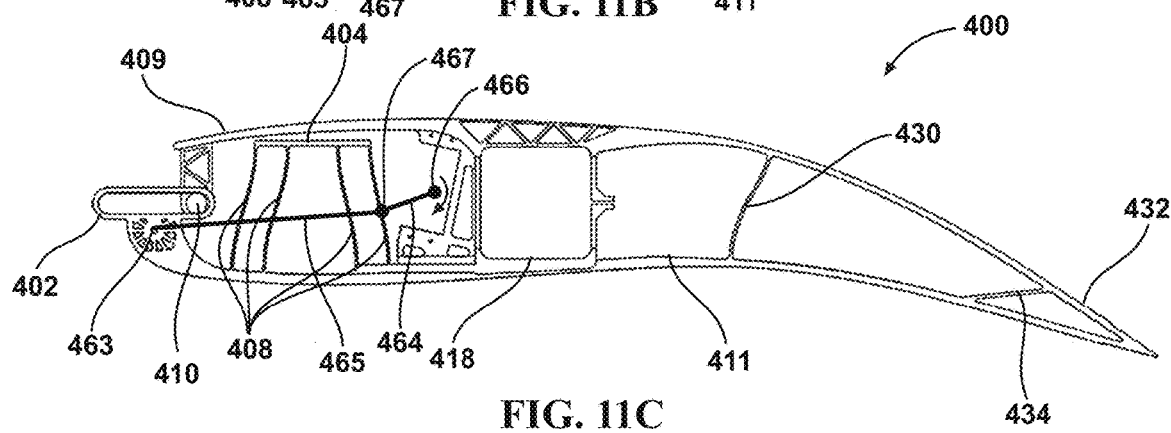
Figure 11D:
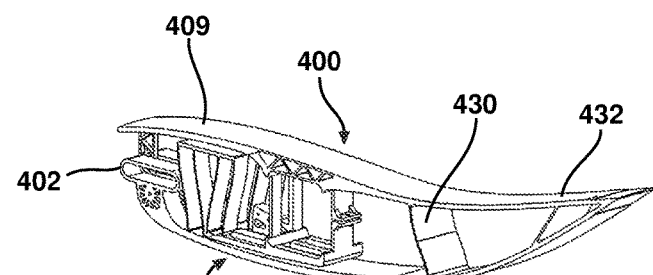

Referring now to FIGS. 11A through 11F, the actuator rib 400 is shown in side views and perspective views of neutral and deformed states (e.g. trailing edge 432 upwardly deflected and downwardly deflected.) In FIGS. 11A and 11D, the trailing edge 432 is deflected upward due to the motion control slot 402 being pulled in the direction of the main spar by the control linkage 465, while sliding on the front spar 502 (not shown, see FIG. 12), and reaches the forward end of the motion control slot 402. The interior surface of the motion control slot 402 slides on the front spar 502 (not shown, see FIG. 12) which passes through aperture 410 of the actuated rib 400. The vertical compliant legs 408 of the compliant mechanism 404 and the compliant web 430 are deflected to permit the lower surface 411 to move forward relative to the upper surface 409 of the actuator rib 400 and thus causing the trailing edge to deflect upward. The actuator rib 400 is powered by a rotary actuator (not shown) with shaft axis of revolution at location 466. The shaft of the rotary actuator 466 turns a control arm and connects to a control linkage 465 at the pinned joint 467 of the control arm. A pin (not shown) is inserted through the aperture 463, connecting the ball joint rod end of the control linkage 465. The rotary drive actuator (not shown) transmits force into the actuator rib 400 at in pinned connection 463 through the control arm 464 and control linkage 465.

Figure 11E:
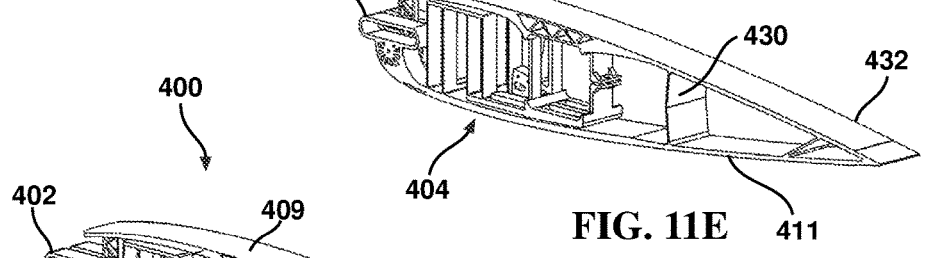
Figure 11F:
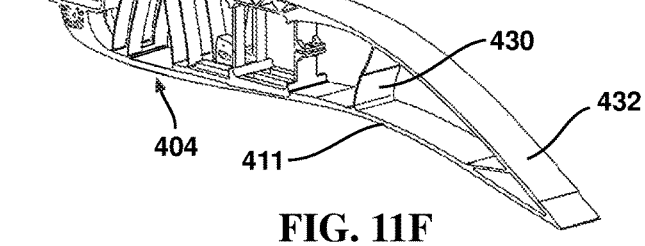

In FIGS. 11C and 11F, the trailing edge 432 is deflected downward due to the control arm/linkage 464,465 pulling the pinned connection 463 in the forward direction. The vertical compliant legs 408 of the compliant mechanism 404 and the compliant web 430 are deflected to permit the upper surface 409 to move aft relative to the lower surface 411 of the actuator rib 400 and thus causing the trailing edge to deflect downward. FIGS. 11B and 11E show a neutral condition—e.g. no actuation force acting on the actuator rib 400.

Figure 12:
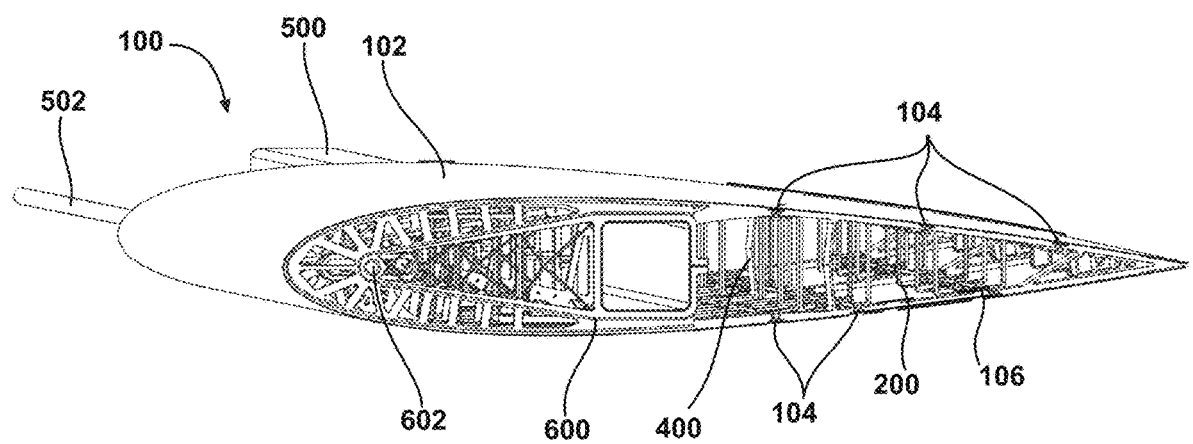
FIG. 12 is a perspective view of a portion of a morphing cambered wing.

Referring now to FIG. 12, a partial airfoil 100 cutaway to show a complete conformal skin system for a cambered morphing control surface is depicted. The complete system includes flexible conforming skin 102 positioned around the internal structural parts. The internal structural parts include a main spar 500 and a forward spar 502 configured to connect the actuator ribs 400 and the compliant ribs 200 together. The standoff mounts 104 are attached to the flexible conforming skin 102 and the stringers 106 are inserted through the openings in the mounts 104 and connects the conforming skin 102 to the actuator ribs 400 and the compliant support ribs 200. The stringers 106 pass through slots 210 and 212 (FIG. 8A) of the compliant support ribs 200 and across the inner surfaces 461,462 of the actuated ribs 400. The leading edge structural support 600 attaches to the main spar 500, by means of the flange 606 (see FIG. 14), and makes 600 a cantilever member. A plurality of leading edge supports 600 supports the front spar 502 by attachment at aperture 602 (see FIG. 14). The leading edge interior surface of the flexible conforming skin 102 is attached to the skin mating surface 608 (see FIG. 14) of the plurality of leading edge supports 600.

Figure 13:
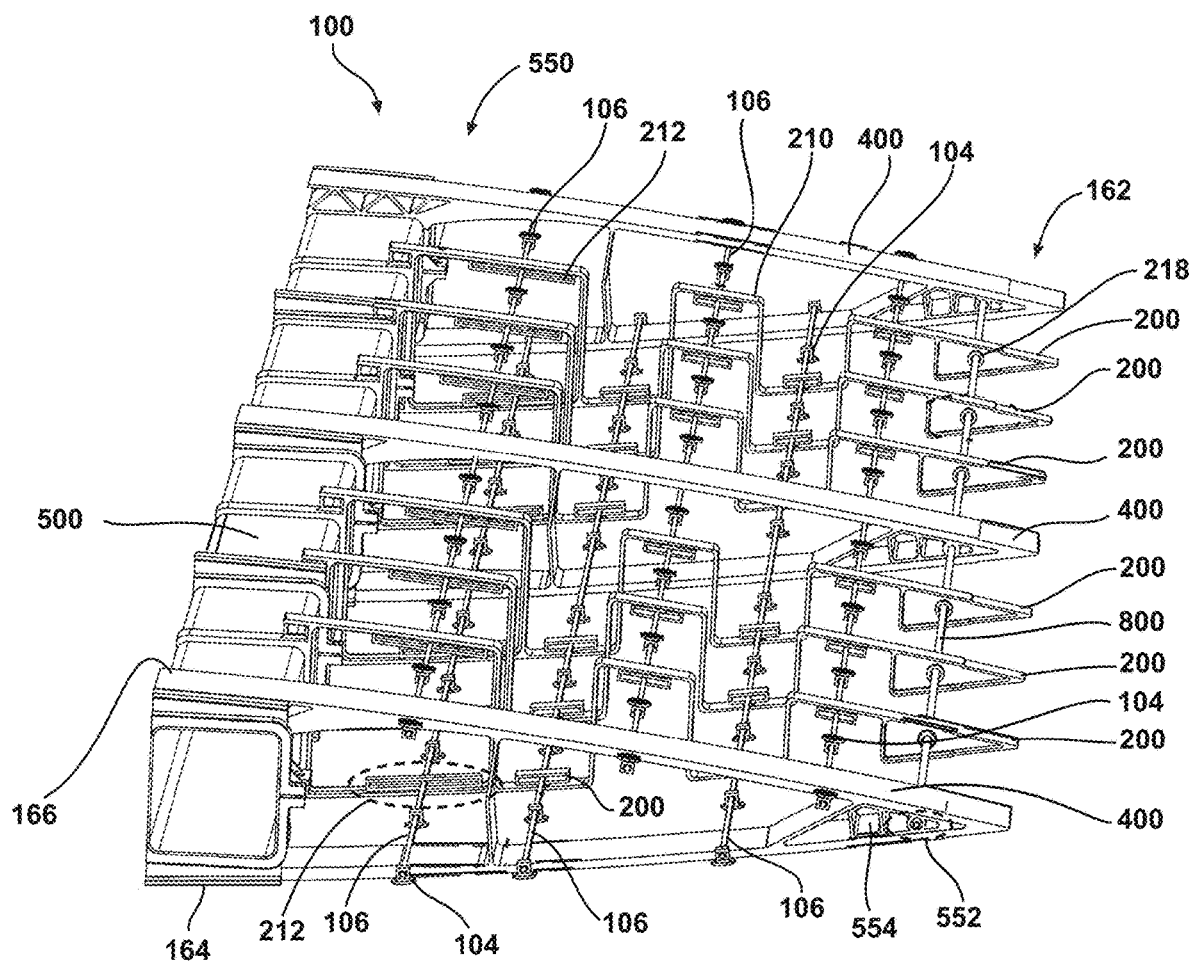
FIG. 13 is a view of a wing structure with the flexible conforming skin removed to reveal internal parts.

Referring now to FIG. 13, a portion of the airfoil 100 showing an inner system 550 with the skin removed for clarity is depicted. A plurality of primary actuation ribs 400 are intermittently spaced across the wing structure with compliant structural support ribs 200 intermittently positioned therebetween. A stringer 800 in the trailing edge 162 interfaces with the actuator ribs 400 using a revolving hour-glass shaped stringer pass-through aperture 552, similar to that of 218 (see FIG. 8B), in the trailing edge insert 554. The trailing edge insert 554 is connected to the triangular region in the trailing edge of the actuated rib 400, located aft of the rigid web 434 (see, FIG. 10). The same trailing edge stringer 800 also interfaces with the compliant support ribs 200 through an aperture insert 218. Stringers 106 pass-through the openings of stringer standoff mounts 104 to connect the ribs 400, 200 to the skin (not shown). The stringers 106 glide on the interior of the actuator ribs 400 on both the upper 166 and lower surfaces 164. The stringers 106 are attached to the skin (not shown) via the standoff mounts 104 and slide within the motion containing slots 212, 210 of the compliant support ribs 200.

Figure 14A:
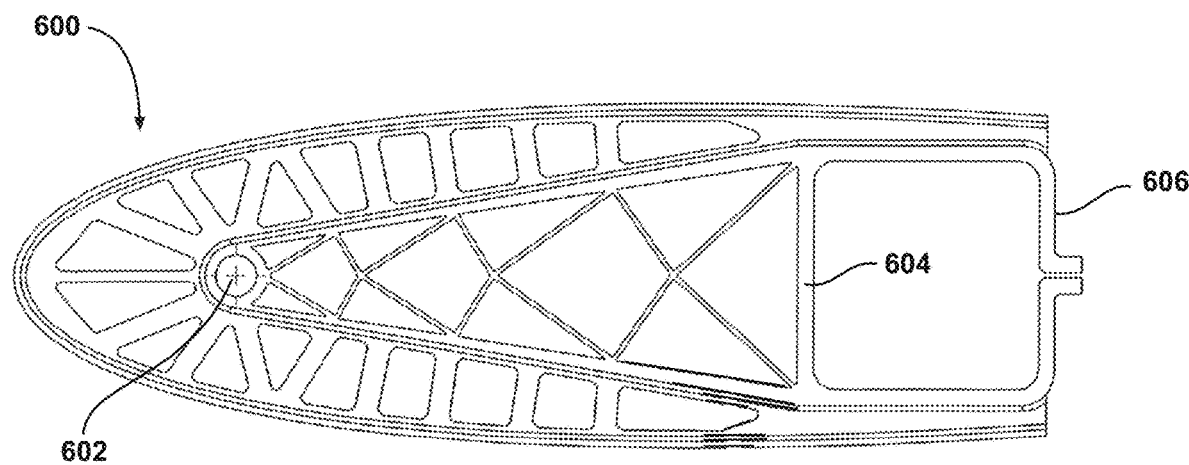
FIGS. 14A, 14B, and 14C are various views of the front spar support located proximate the leading edge of an airfoil.
Figure 14B:
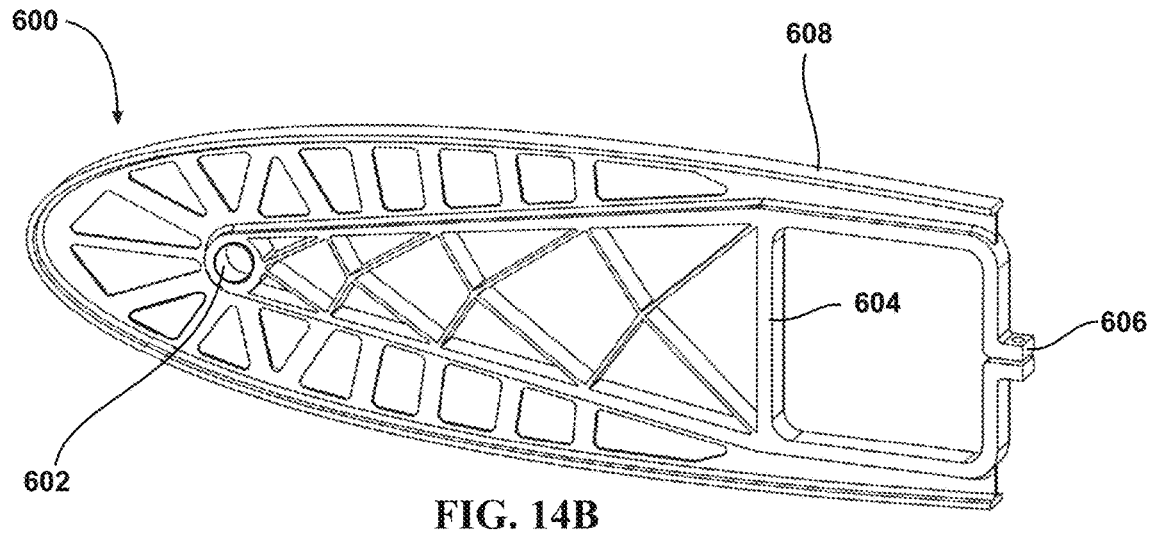
Figure 14C:
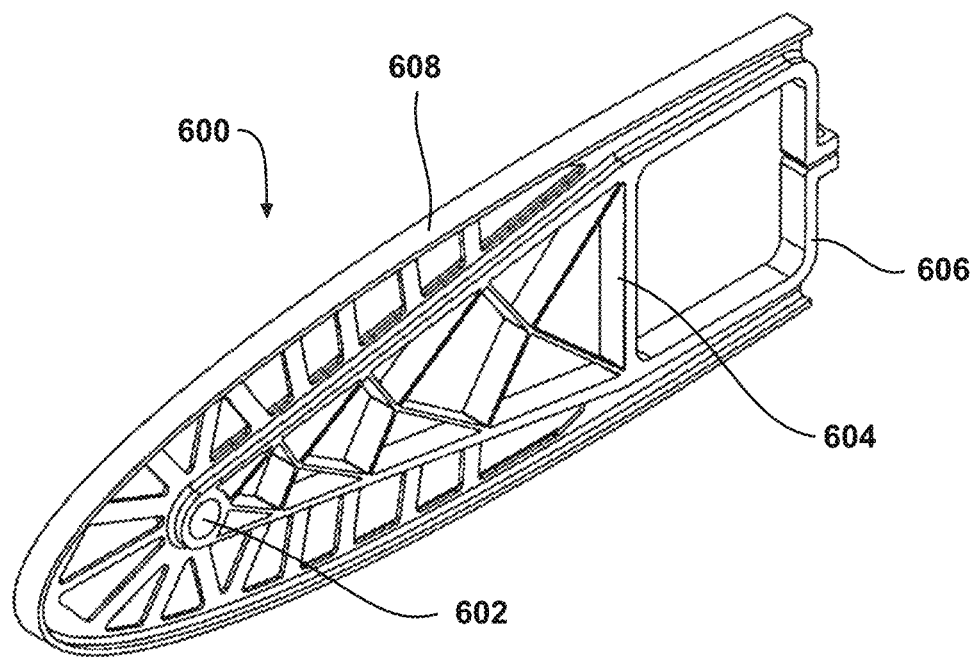

Referring now to FIG. 14A through 14C, a leading edge structural support member 600 is illustrated in various views. The leading edge structural support member 600 is optimized to provide an optimal stiffness per unit volume to maintain the rigidity of the front spar 502 (not shown—See FIG. 12) which interfaces through an aperture 602. The leading edge is stiffened by a vertical web 604 at the mid-plane of the leading edge structural support member 600. A flange 606 is connected to a main spar as illustrated above in FIG. 12. A plurality a leading edge structural support members 600 are positioned at intermediate locations between and/or beside the actuator ribs 400. The skin mating surface 608 is attached to the leading edge interior surface of the flexible conforming skin 102 (not shown, see FIG. 12) by means of bonding or traditional fastening techniques.

Figure 15:
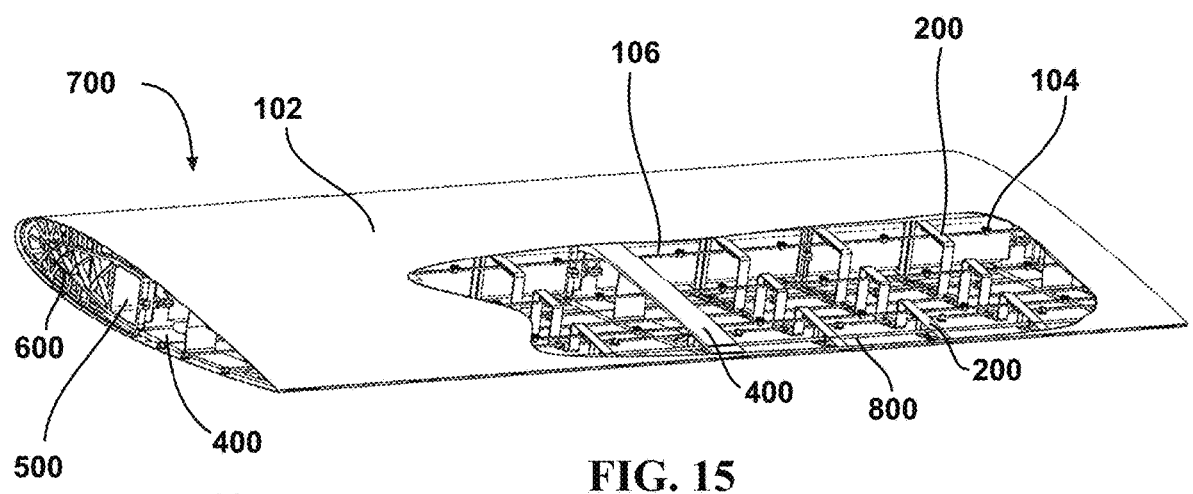
FIG. 15 is another view of a complete wing structure with a portion of the skin cut away to show internal components.
Figure 16:
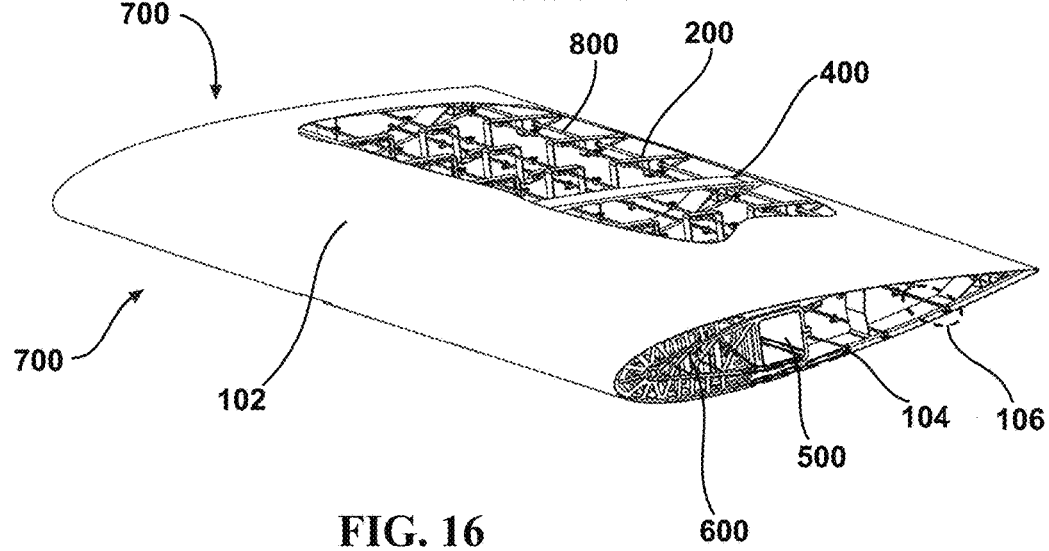
FIG. 16 is another view of a complete wing structure with a portion of the skin cut away to show internal components.

Referring now to FIGS. 15 and 16, complete morphing wing sections 700 are shown with cutaways of portions of the conforming skin 102 in order to show the internal components of wing structure. The leading edge structural support members 600, actuator ribs 400, compliant ribs 200, stringers 106, standoff attachments 104 and main spar 500 are shown in an assembled condition. Compliant support ribs 200 are shown spaced between the actuator ribs 400. The standoff mounts 104 are shown distributed across the inner surface of the flexible conforming skin 102 with stringers 106 running through the openings in the standoff mounts.

In one form, the composite laminate skin surface can be constructed from multiple carbon fiber plys or layers, including a combination of woven and/or unidirectional fabrics, giving the skin different properties in different directions (anisotropic). For instance, the composite skin can be made using a dry fabric layup on a profiled tool and a resin infusion process.

As an example, the cured composite skin can be deburred and trimmed to the desired dimensions. Locations for stringer offset mounts can be indexed and marked on an inner surface of the flexible composite skin. Marked locations on the skin surface can be abraded and cleaned prior to bonding the stringer standoff mounts onto the inner surface of the skin.

Alternatively, the composite skin can be made from "dry" fabric/fiber and using a resin infusion process or it can made from "wet" prepreg fabric/fibers. The composite skin can be cured using any of, but not limited to, the following techniques and/or methods or any derivatives thereof: room temperature cure, oven temperature cure, autoclave cure and electron beam cure.

The composite skins can be manufactured using any of, but not limited to, the following tooling methods for composite fabrication or any derivatives thereof: bagging (vacuum or autoclave) on male or female tools, and clamshell molds.

The composite skin can be manufactured from any combination of, but not limited to, the following materials or any derivatives thereof: carbon fiber, fiberglass, Kevlar, carbon fiber nano-tubes, other composite fabric/fiber materials (synthetic and natural), polymers, ceramics, metallic foils, and thin metallic sheet.

The stringer standoff mounts can be manufactured in any of a variety of ways. One exemplary embodiment includes stereolithography 3D printing. Rigid UV-cured plastic standoff mounts can be reinforced by bonding a metallic U-shaped cap onto the outside surface of each stringer standoff mount, which helps to provide an optimal strength to weight ratio. Standoff mounts can also include a knurled or cross-hatched pattern embossed into the underside of the base for increasing surface area for bonding and ensuring a consistent bond line thickness.

The stringer standoff mounts can be abraded, cleaned and then bonded into place on the inner skin surface of the flexible composite with a high-strength two-part epoxy designed specifically for bonding carbon fiber composites. The stringer standoff mounts can be made from any combination of, but not limited to, the following materials or any derivatives thereof: metals, polymers, ceramics, plastics, composite fiber/fabric, and chopped composite fiber.

The stringer standoff mounts can be manufactured using any combination of the following techniques or any derivatives thereof: 3D printing, machining, casting, forging, stamping, injection molding, composite fabrication, and so forth.

The overall design is configured so that the flexible stringers are inserted and threaded through the openings of the corresponding stringer standoff mounts, as well as, attaching to (and/or gliding on, and/or being inserted through) any additional active and passive structural components. The stringers may be formed into a variety of cross-sectional shapes, including but not limited to circular, square, rectangular, polygonal and oval, I-beam, C-channel and T-beam. Further, the stringers may be solid or hollow depending on the application. Stringers be manufactured using any combination of fiber/fabric directions from any composite material and/or metallic, ceramic, polymer material in any form including but not limited to sheet/film. The skin configurations can be tailored by adjusting the quantity, spacing, size, locations and material properties of the flexible stringers and the stringer standoff mounts.

The actuator ribs and compliant support ribs can be manufactured using any combination of the following techniques, or any derivatives thereof: 3D printing, machining, casting, forging, stamping, injection molding, and composite fabrication. Material selections for the compliant support ribs can be made from any combination of metals, plastics, ceramics, polymers, composite fiber/fabric, and chopped composite fiber.

In one aspect, the present disclosure includes a morphing structure comprising: a plurality of actuator ribs having a leading edge and a movable trailing edge; a plurality of compliant support ribs positioned between the actuator ribs; and an anisotropic flexible skin connected to the actuator rib and the compliant support ribs to form a pressure side surface and a suction side surface of an airfoil.

In refining aspects, each compliant support rib includes a pair of opposing arms extending forward proximate a leading edge of the airfoil; wherein each of the opposing arms include a forward facing lip; further comprising an attachment aperture formed in each of the lips; further comprising an enclosed element extending aft of the opposing arms; wherein the enclosed element is defined by a forward wall and an aft wall with an upper wall and lower wall extending between the forward and aft walls; further comprising a stringer channel connected to the upper wall and the lower wall of the enclosed element; further comprising a periodic structure formed substantially in a square wave pattern extending aft of the enclosed element; wherein the periodic structure includes intermittent bottom walls connected to intermittent top walls with side walls therebetween; wherein the top walls and bottom walls are inwardly tapered toward the trailing edge; wherein each of the top walls and the bottom walls include a stringer slot connected thereto; further comprising a triangular shaped structure forming a trailing edge aft of the periodic structure; further comprising a stringer aperture extending through triangular structure; wherein the compliant support ribs keep the skin in a desired airfoil shape when morphing, wherein the compliant rib moves in response to movement of the actuator rib; wherein the movement of the compliant rib is caused by movement of the skin.

In another aspect, a compliant rib for a morphing airfoil comprises: a pair of opposing arms extending forward proximate a leading edge of the airfoil terminating with forward facing lip; an enclosed element extending aft of the opposing arms; a periodic structure formed substantially in a square wave pattern extending aft of the enclosed element; and a triangular shaped structure having a stringer aperture forming a trailing edge aft of the periodic structure.

In refining aspects, the periodic structure includes intermittent bottom walls connected to intermittent top walls with side walls; further comprising a stringer channel connected to the top walls and the bottom walls of the periodic structure; further comprising a substantially continuous flexible skin covering the compliant rib formed in a shape of an airfoil; wherein the pair of opposing arms clamp around a main spar.

In another aspect a vehicle having a morphing wing comprises: a plurality of actuator ribs having a leading edge and a movable trailing edge; a plurality of compliant support ribs positioned between the actuator ribs; an anisotropic flexible skin connected to the actuator rib and the compliant support ribs to form a continuous suction side surface of an airfoil; and a control system operable for moving the actuator ribs.

In refining aspects, the compliant support ribs are movable by the flexible skin in response to the movement of the actuator ribs.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A morphing structure comprising:
a plurality of actuator ribs having a leading edge and a movable trailing edge;
a plurality of compliant support ribs positioned between the actuator ribs; and
an anisotropic flexible skin connected to the actuator rib and the compliant support ribs to form a pressure side surface and a suction side surface of an airfoil.

2. The morphing structure of claim 1, wherein each compliant support rib includes a pair of opposing arms extending forward proximate a leading edge of the airfoil.

3. The morphing structure of claim 2, wherein each of the opposing arms include a forward facing lip.

4. The morphing structure of claim 3, further comprising an attachment aperture formed in each of the lips.

5. The morphing structure of claim 2, further comprising an enclosed element extending aft of the opposing arms.

6. The morphing structure of claim 5, wherein the enclosed element is defined by a forward wall and an aft wall with an upper wall and lower wall extending between the forward and aft walls.

7. The morphing structure of claim 6, further comprising a stringer channel connected to the upper wall and the lower wall of the enclosed element.

8. The morphing structure of claim 5, further comprising a periodic structure formed in a square wave pattern extending aft of the enclosed element.

9. The morphing structure of claim 8, wherein the periodic structure includes intermittent bottom walls connected to intermittent top walls with side walls therebetween.

10. The morphing structure of claim 9, wherein the top walls and bottom walls are inwardly tapered toward the trailing edge.

11. The morphing structure of claim 9, wherein each of the top walls and the bottom walls include a stringer slot connected thereto.

12. The morphing structure of claim 8, further comprising a triangular shaped structure forming a trailing edge aft of the periodic structure.

13. The morphing structure of claim 12, further comprising a stringer aperture extending through triangular structure.

14. The morphing structure of claim 1, wherein the compliant support ribs keep the skin in a desired airfoil shape when morphing.

15. The morphing structure of claim 1, wherein the compliant rib moves in response to movement of the actuator rib.

16. The morphing structure of claim 15, wherein the movement of the compliant rib is caused by movement of the skin.

17. A compliant rib for a morphing airfoil comprising:
a pair of opposing arms extending forward proximate a leading edge of the airfoil terminating with forward facing lip;
an enclosed element extending aft of the opposing arms;
a periodic structure formed in a square wave pattern extending aft of the enclosed element; and
a triangular shaped structure having a stringer aperture forming a trailing edge aft of the periodic structure.

18. The compliant rib of claim 17, wherein the periodic structure includes intermittent bottom walls connected to intermittent top walls with side walls.

19. The compliant rib of claim 17 further comprising a stringer channel connected to the top walls and the bottom walls of the periodic structure.

20. The compliant rib of claim 17, further comprising a continuous flexible skin covering the compliant rib formed in a shape of an airfoil.

21. The compliant rib of claim 17, wherein the pair of opposing arms clamp around a main spar.

22. A vehicle having a morphing wing comprising:
a plurality of actuator ribs having a leading edge and a movable trailing edge;
a plurality of compliant support ribs positioned between the actuator ribs;
an anisotropic flexible skin connected to the actuator rib and the compliant support ribs to form a continuous suction side surface of an airfoil; and
a control system operable for moving the actuator ribs.

23. The vehicle of claim 22, wherein the compliant support ribs are movable by the flexible skin in response to the movement of the actuator ribs.

* * * * *